(12) United States Patent
Winfrey

(10) Patent No.: US 8,195,758 B1
(45) Date of Patent: Jun. 5, 2012

(54) CONTROL FOR SIGNAL REDUNDANCY

(75) Inventor: Clinton M. Winfrey, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 909 days.

(21) Appl. No.: 12/287,728

(22) Filed: Oct. 9, 2008

(51) Int. Cl.
G06F 15/16 (2006.01)
G06F 15/173 (2006.01)

(52) U.S. Cl. ......... 709/209; 709/208; 709/238; 709/239
(58) Field of Classification Search .................. 709/208, 709/209, 238, 239
See application file for complete search history.

(56) References Cited

U.S. PATENT DOCUMENTS

| | | | |
|---|---|---|---|
| 4,908,828 A | 3/1990 | Tikalsky | 371/69.1 |
| 5,570,389 A | 10/1996 | Rossi | 375/220 |
| 6,347,138 B1* | 2/2002 | Lallukka et al. | 379/220.01 |
| 6,556,953 B2* | 4/2003 | Lay et al. | 702/183 |
| 6,678,268 B1* | 1/2004 | Francis et al. | 370/352 |
| 7,116,633 B2 | 10/2006 | Honda | 370/218 |
| 7,188,292 B2* | 3/2007 | Cordina et al. | 714/748 |
| 7,212,738 B1 | 5/2007 | Wang | 398/2 |
| 7,280,544 B2 | 10/2007 | Tsai et al. | 370/395.6 |
| 7,305,031 B2 | 12/2007 | Ratakonda et al. | 375/240 |
| 7,315,512 B2* | 1/2008 | Xi | 370/228 |
| 7,546,612 B2* | 6/2009 | Skinner et al. | 719/329 |
| 7,756,118 B2* | 7/2010 | Harmon et al. | 370/352 |
| 7,796,502 B2* | 9/2010 | Li | 370/222 |
| 2002/0109878 A1* | 8/2002 | Qiao | 359/118 |
| 2003/0055583 A1* | 3/2003 | Lay et al. | 702/57 |
| 2003/0223422 A1* | 12/2003 | Igarashi et al. | 370/390 |
| 2004/0205071 A1* | 10/2004 | Uesugi et al. | 707/100 |
| 2005/0068896 A1* | 3/2005 | Pazos | 370/235 |
| 2007/0047436 A1* | 3/2007 | Arai et al. | 370/219 |
| 2007/0171817 A1* | 7/2007 | Fujita et al. | 370/225 |
| 2007/0190947 A1* | 8/2007 | Sakai et al. | 455/67.14 |
| 2008/0019388 A1* | 1/2008 | Harmon et al. | 370/412 |
| 2010/0013625 A1* | 1/2010 | Kouzan et al. | 340/508 |

* cited by examiner

Primary Examiner — Hieu Hoang

(74) Attorney, Agent, or Firm — Gerhard W. Thielman, Esq.

(57) ABSTRACT

A process is provided by method and circuit for transmitting message information from a first platform to a second platform. The first platform has first and second servers. The second platform has first and second receivers that correspond to the server counterparts. Each of the servers has a respective server port and each of the receivers has a respective receiver port. Each respective server port corresponds to each respective receiver port. The process includes several steps. First, one of the first and second servers is designated as an assigned server, with the other being a backup server. Second, the message information is sent to the first and second servers. Third, the message information is forwarded to the respective server port that corresponds to the assigned server. Fourth, the message information is transmitted from the respective server port to the respective receiver port that corresponds to the assigned server. Fifth, the message information is forwarded from the respective receiver port to the corresponding receiver. Sixth, assigned and backup verification signals are sent to corresponding receiver ports. Seventh, the verification signals are transmitted to corresponding server ports. Eighth, the verification signals are forwarded to a transmission assigner. Ninth, the process switches from said one of the first and second servers as the backup server and the other as the assigned server in response to absence of the assigned verification signal, otherwise maintaining the one as the assigned server. Preferably, the process further includes terminating transmission of the message information in response to absence of both of the assigned and backup verification signals.

8 Claims, 2 Drawing Sheets

CONTROL FOR SIGNAL REDUNDANCY

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to signal redundancy. In particular, the invention provides control for switching from an assigned transmitter to a backup transmitter without redundant signal communication.

Communication between at least two electronic or computer platforms can be compromised by intermittent interruptions. To ensure reliability for transmit and receipt of a message, such communication may be sent across two or more channels. In particular, these processes involve duplicate transmission and reception channels with attendant hardware and protocols for selecting which channel to accept.

SUMMARY

Conventional redundant transmission methods yield disadvantages addressed by various exemplary embodiments of the present invention. In particular, these inventive embodiments involve a complimentary pair of transmitters and receivers, both sending verification signals but only one designated set sending and receiving the message, the other set remaining on standby until the designated set is interrupted.

Various exemplary embodiments provide for transmitting message information from first to second computer platforms. The first platform has first and second servers. The second platform has corresponding first and second receivers. Each of the servers has a respective server port and each of the receivers has a respective receiver port. Each respective server port corresponds to each respective receiver port. The process includes several steps. First, one of the first and second servers is designated as an assigned server, with the other being a backup server. Second, the message information is sent to the first and second servers. Third, the message information is forwarded to the respective server port that corresponds to the assigned server.

Fourth, the message information is transmitted from the respective server port to the respective receiver port that corresponds to the assigned server. Fifth, the message information is forwarded from the respective receiver port to the corresponding receiver. Sixth, assigned and backup verification signals are sent to corresponding receiver ports. Seventh, the verification signals are transmitted to corresponding server ports. Eighth, the verification signals are forwarded to a transmission assigner. Ninth, the process switches from said one of the first and second servers as the backup server and the other as the assigned server in response to absence of the assigned verification signal, otherwise maintaining the one as the assigned server.

Various exemplary embodiments also provide terminating transmission of the message information in response to absence of both of the assigned and backup verification signals. Various exemplary embodiments alternatively provide comparison of transmission delay to an acceptable threshold for determining whether to switch assigned and backup servers.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The software redundancy algorithm enables redundancy of communication between two computer platforms without duplicate transmission of the data. The benefit of this approach is that the data are only transmitted over the assigned signal (through which all data pass). The backup signal (that takes over the sending of data in case the assigned signal fails) sends only any a handshake that verifies receipt of the signal.

In many communication scenarios, data may be sensitive to compromise. Various exemplary embodiments maintain redundancy without actually sending the data over both (assigned and backup) signals during the entire communication interval. Of course, probability of unauthorized interception and decryption of a message increases as the transmission period lengths and with message repetition.

Under the disclosed embodiments, a single signal transmission reduces the probability of interception by restricting transmission to a single instance. This approach provides further benefit by requiring less bandwidth than conventional methods because only the assigned signal sends large amounts of data or sensitive information vulnerable to compromise.

The exemplary embodiments provide this switching operation for content message exchange through logical algorithms, coupled with verification message exchange to ensure continuity in transmission and reception. These aspects are further described in FIGS. 1 and 2. This process enables implementation of this redundancy using logical commands and without the necessity of additional hardware.

Figure 1:
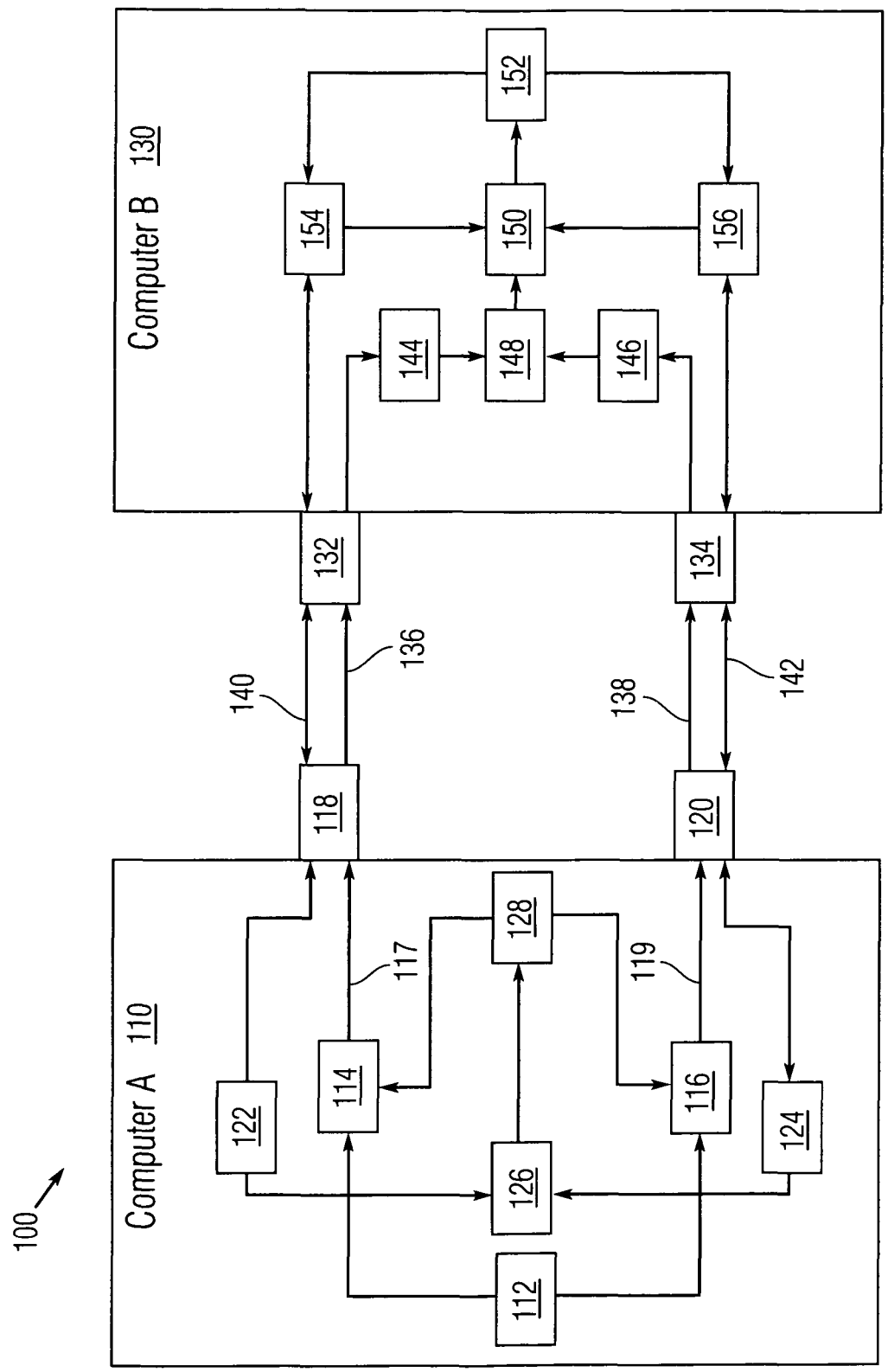
FIG. 1 is a block diagram view of message routing.

FIG. 1 shows a block diagram view 100 of a redundant signal logical schematic. A first computer "A" 110 creates a message 112 sent to a first client 114 and to a second client 116. The message 112 indicates which of the first and second servers has been assigned for communication, with the default at initiation being decided àpriori. If the message 112 indicates communication assignment to the first server as condition 117, the first client 112 forwards the message to a first Ethernet port 118. However, if instead the message 112 indicates communication assignment to the second server as condition 119, the second client 114 forwards the message to a second Ethernet port 120.

Upon receipt (discussed subsequently), the first port 118 sends a receiver message to a first verification client 122, or else the second port 120 sends a receiver message to a second verification client 124. Either client 122, 124 forwards its message to a first signal checker 126, which declares a communications assigner 128 as being either the first or second server. The other non-assigned server constitutes the backup. The assigner 128 in turn provides the corresponding value to the first and second clients 114, 116 as updates.

A second computer "B" 130 receives the message 112 from the first computer 110 through third and fourth Ethernet ports 132, 134. The first Ethernet port 118 transmits the message 112 by a first message socket 138 to the third Ethernet port 132, whereas the second Ethernet port 120 transmits the message 112 by a second message socket 138 to the fourth Ethernet port 134. The third and first ports 132, 118 exchange verification signals by a first verification socket 140. The fourth and second ports 134, 120 exchange verification signals by a second verification socket 142.

If received by the third port 132, the message 112 is forwarded to a first message server 144. If received by the fourth port 134, the message 112 is instead forwarded to a second message server 146. A received message 148 is provided as an update from either of the first and second servers 144, 146. A second signal checker 150 receives the received message 148 and declares a communications assigner 128 as either the first or second message server 144 or 146 based on the message 148 for the second computer 130.

The checker 150 provides a source signal to a confirmation indicator 152, which forwards the identity of the assigned signal to the first and second verification servers 154, 156. For the first message server 144 being assigned the first server 154 submits a verification signal to the checker, as well as to the third Ethernet port 132, which transmits that return signal via the verification socket 140 to the first Ethernet port 118.

For the second message server 146 being assigned, the second server 156 submits the verification signal to the checker, as well as to the fourth Ethernet port 134, which transmits that return signal via the verification socket 142 to the second Ethernet port 120. The first and second ports 118, 120 respectively submit the (conditionally received) return signal to the first and second verification clients 122, 124 and to the first signal checker 126.

The message 112 can be sent from the first computer 110 to the second computer 130 only by either the first signal (indicating the first message server 144 being assigned for communication) through the first message socket 136 or else the second signal (indicating the second message server 146 being assigned for communication) through the second message socket 138. The message 112 cannot logically be sent to the second computer 130 via both message sockets 136, 138 concurrently. The verification clients 122, 124 both operate simultaneously for receiving the return signal.

Figure 2:
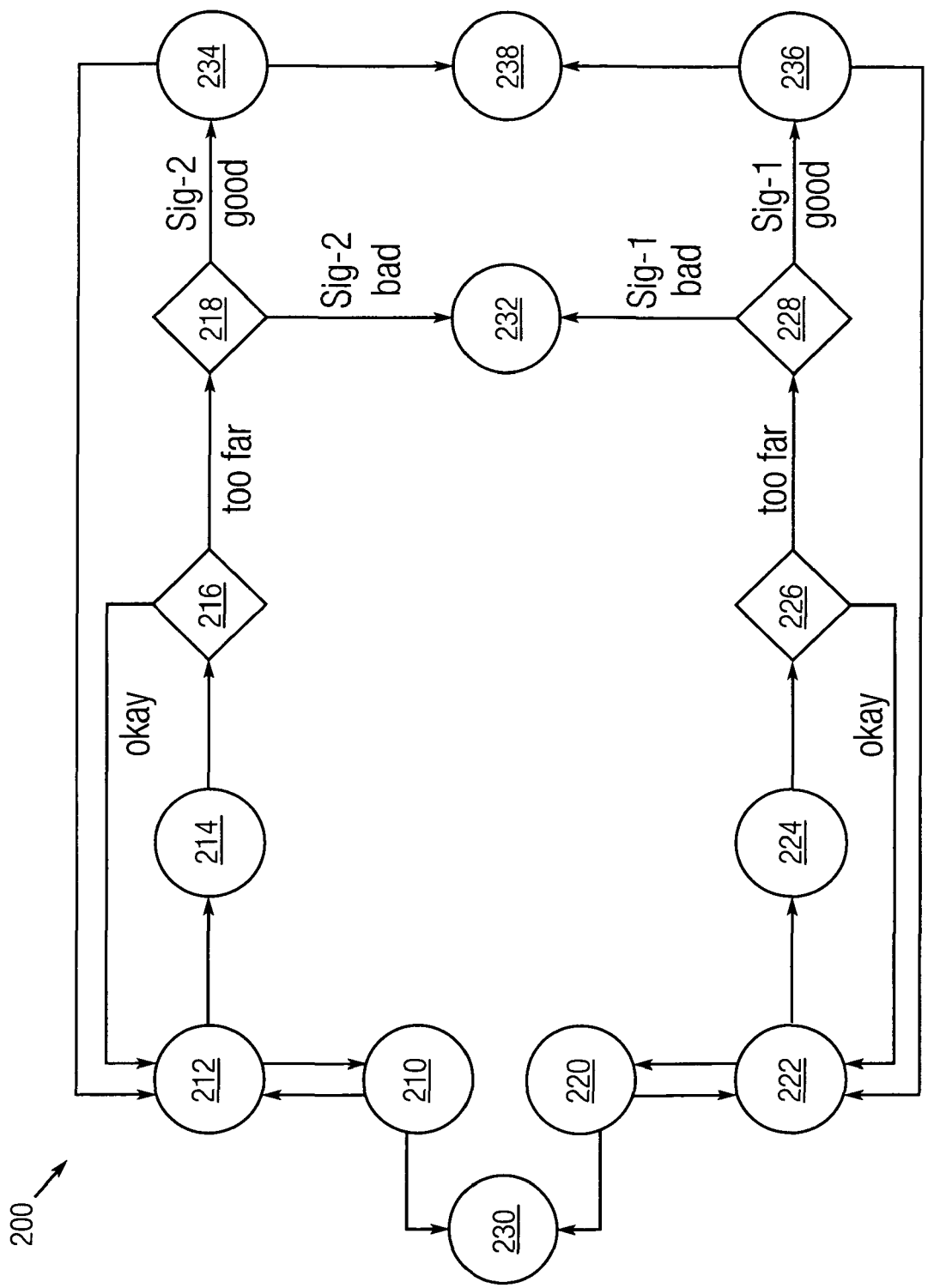
FIG. 2 is a block diagram view of operational sequencing.

FIG. 2 shows a block diagram view 200 of a signal checker. A first signal client 210 communicates with a first signal server 212 to determine a first signal reception time 214. A first response query 216 compares the first time 214 to an acceptable delay threshold (based on comparing message and system time-stamps). If satisfied, the query 216 sends an okay signal to the server 212; but otherwise sends a first excessive signal to a first quality determiner 218.

A second signal client 220 communicates with a second signal server 222 to determine a second signal reception time 224. A second response query 226 compares the second time 224 to an acceptability threshold. If satisfied, the query 226 sends an okay signal to the server 222; but otherwise sends a second excessive signal to a second quality determiner 228.

The first and second clients 210, 220 send a first message 230 to identify which message server (144 or 146) to receive communication assignment.

Depending on which server is assigned for communication, the first and second clients 210, 220 can send a signal to the assigner 128 in response to the signal time (first 214 or second 224 as applicable) being satisfactory. The first quality determiner 218 determines whether the second message server 146 is unacceptable (after the first query 216 has found the first time delay to be excessive). The second quality determiner 228 determines whether the first message server 144 is unacceptable (after the second query 226 has found the second time delay to be excessive).

In response to the alternate signal being unacceptable, the associated the first or second determiner 218, 228 sends a signal to a signal terminator 232 to terminate communication. Thus, if the assigned server's time response (214 or 224) exceeds the delay threshold, and also the backup server is determined to be unacceptable, communication ceases completely. However, if the assigned server's time response exceeds the delay threshold, but the alternate backup server is acceptable, communication switches to that backup.

Acceptability of a server as a backup depends on transmission and receipt of the backup's verification signal. Thus, both the assigned and backup servers (first and second 144, 146) preferably send their respective verification signals to indicate their active status. Failure of the message signal being received from the assigned server within the threshold delay together with failure of the backup verification signal terminates communication between the computers 110, 130.

If the first determiner 218 finds the second message server 146 to be acceptable, the communication assignment switches thereto by a first switch message 234. Similarly, if the second determiner 228 finds the first message server 144 to be acceptable, the communication assignment switches thereto by a second switch message 236. Both messages 234, 236 can then submit a second message 238 to identify which server to receive communication assignment, as similarly to the clients 210, 220 for the first message 230.

Data are generally transmitted over a network from one computer (e.g., Computer "A" 110) to another (e.g., Computer "B" 130) via socket communication. A socket server (computer 130) and a socket client (computer 110) can talk to each other in this way. Each side of a socket 118, 120, 132, 134 can be provided a port number and Internet Protocol (IP) Address of the platform to be communicated with. A signal may have access to thousands of sockets, each with different purposes.

Using the redundancy algorithm, each signal is constantly verified through a strictly designated socket for verifying the signal. This is accomplished by sending a message from one side (i.e., computer) to the other, responding back, and creating time-stamps at both sides. Those time-stamps can be continually compared to system-time through a separate thread. If the difference between system-time and the time-stamp exceeds some threshold (as determined by its determiner 218 or 228), that signal is declared dead and transmission ceases through that message server.

In various exemplary methods, two signals are used (although more signals could easily be used with this approach). The one of the signals can be declared as the designated signal through the assigned server. The designated signal represents the communication path through which to transmit all important data. Both sides of the communication path acknowledge which server has been assigned, and each socket verifies the assigned IP address as the designation before sending data. If the socket's IP address matches the assigned IP address, the socket sends data. Otherwise, the signal must be the backup, subject to remaining on standby until it is declared to be assigned. If the assigned server fails (e.g., interruption beyond the threshold), the backup is declared to be assigned, and the conditional logic allows communication through its socket. If the previous assigned server (that failed) ever returns to operational status, it becomes the backup to the new (and current) assigned server.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for transmitting message information from a first computer platform to a second computer platform, said first platform having a first server and a second server, said second platform having a first receiver and a second receiver that correspond to said first and second servers, each of said servers having a respective server port and each of said receivers having a respective receiver port, said each respective server port corresponding to said each respective receiver port, said method comprising:
   designating one of the first and second servers as an assigned server, and its other as a backup server;
   sending the message information to the first and second servers;
   forwarding the message information to the respective server port that corresponds to said assigned server;
   transmitting the message information from the respective server port to the respective receiver port that corresponds to said assigned server;
   forwarding the message information from the respective receiver port to the corresponding receiver;
   sending an assigned verification signal and a backup verification signal to corresponding receiver ports;
   transmitting said verification signals to corresponding server ports;
   forwarding said verification signals to a transmission assigner;
   switching from said one of the first and second servers as said backup server and said other as said assigned server in response to absence of said assigned verification signal, otherwise maintaining said one as said assigned server; and
   terminating transmission of the message information in response to absence of both said assigned and backup verification signals.

2. The method according to claim 1, wherein said each server port has a message socket for transmitting and receiving the message information and a confirmation socket for transmitting and receiving said signal verification.

3. The method according to claim 1, wherein sending said verification signals further includes discontinuing said assigned verification signal in response to a delay of the message information exceeding an acceptable threshold.

4. The method according to claim 3, wherein exceeding said threshold includes comparing a system-time with a time-stamp of the message information.

5. A logic circuit to provide instructions for transmitting message information from a first computer platform to a second computer platform, said first platform having a first server and a second server, said second platform having a first receiver and a second receiver that correspond to said first and second servers, each of said servers having a respective server port and each of said receivers having a respective receiver port, said each respective server port corresponding to said each respective receiver port, said circuit comprising:
   an assigner for designating one of the first and second servers as an assigned server, and its other as a backup server;
   a first message transmitter for sending the message information to the first and second servers;
   a second message transmitter for forwarding the message information to the respective server port that corresponds to said assigned server;
   a third message transmitter for transmitting the message information from the respective server port to the respective receiver port that corresponds to said assigned server;
   a fourth message transmitter for forwarding the message information from the respective receiver port to the corresponding receiver;
   a first verification transmitter for sending an assigned verification signal and a backup verification signal to corresponding receiver ports;
   a second verification transmitter for transmitting said verification signals to corresponding server ports;
   a transmission assigner for receiving said verification signals from said server ports, and for switching from said one of the first and second servers as said backup server and said other as said assigned server in response to absence of said assigned verification signal, otherwise maintaining said one as said assigned server; and
   a disconnect for terminating transmission of the message information in response to absence of both said assigned and backup verification signals.

6. The circuit according to claim 5, wherein said each server port includes a message socket for transmitting and receiving the message information and a confirmation socket for transmitting and receiving said signal verification.

7. The circuit according to claim 5, further including a comparator for comparing a delay of the message information against an acceptable threshold, wherein said seventh transmitter further provides for discontinuing said assigned verification signal in response to said delay exceeding said acceptable threshold.

8. The circuit according to claim 7, wherein said comparator compares a system-time with a time-stamp of the message information.

* * * * *